United States Patent [19]

Fergusson

[11] 3,810,139
[45] May 7, 1974

[54] TEMPERATURE RESPONSIVE SIGNALING DEVICE

[76] Inventor: Alexander H. B. Fergusson, 1480 N. Palm Ave., Apt. 5, Rialto, Calif. 92376

[22] Filed: Nov. 29, 1972

[21] Appl. No.: 310,438

[52] U.S. Cl. ............................... 340/229, 340/234
[51] Int. Cl. ........................................... G08b 21/00
[58] Field of Search .......... 340/234, 244 AC, 227.1, 340/229

[56] References Cited
UNITED STATES PATENTS
3,237,156  2/1966  Irvine .............................. 340/234 X
3,239,829  3/1966  Cline et al. ..................... 340/244 A FOREIGN PATENTS OR APPLICATIONS
1,192,741  10/1959  France ............................... 340/234
933,941    8/1963   Great Britain ..................... 340/234

Primary Examiner—John W. Caldwell
Assistant Examiner—Daniel Myer
Attorney, Agent, or Firm—Smyth, Roston & Pavitt

[57]  ABSTRACT

A temperature responsive signaling device comprising a supporting structure adapted to project above a supporting surface, an electrical power source carried by the supporting structure, a light mounted on the supporting structure, a circuit for coupling the power source to the light, a temperature responsive device for opening and closing the circuit to the light in response to predetermined temperatures, and a mechanism for causing the light to flash when the circuit to the light is closed.

4 Claims, 8 Drawing Figures

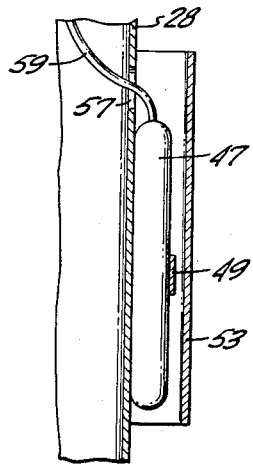
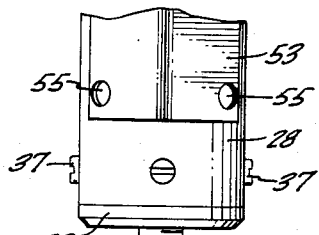
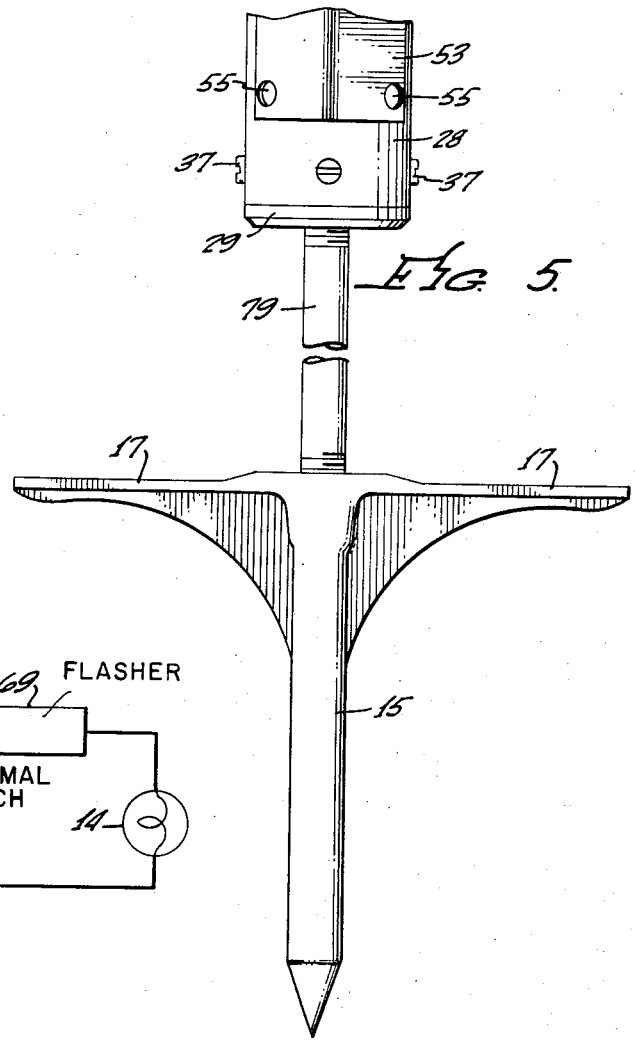
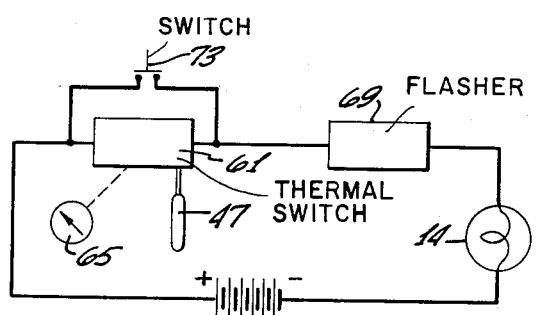
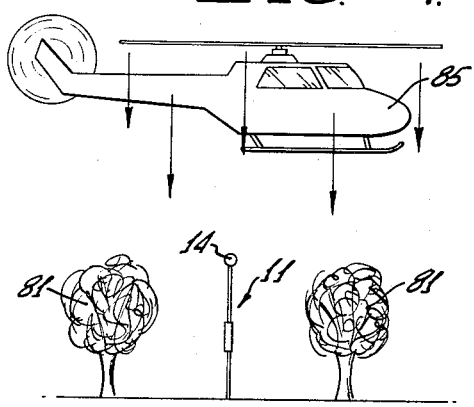
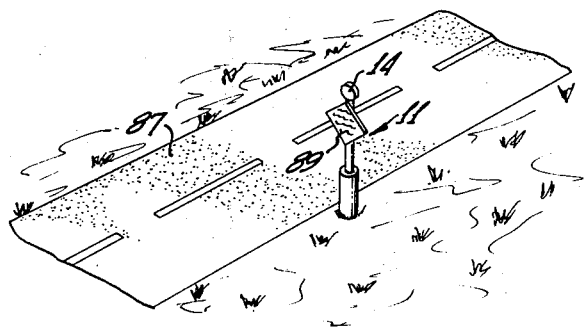

TEMPERATURE RESPONSIVE SIGNALING DEVICE

BACKGROUND OF THE INVENTION

There are numerous situations in which persons must react upon the occurrence of predetermined air temperature conditions. For example, if freezing conditions occur on a wet roadway, the driver of the vehicle must react to this obvious danger by taking added precautions. Similarly, if the ambient air temperature at an orchard nears the frost danger level, the orchard manager must react to this obvious danger to his crop by attempting to supply heat to the orchard or by preventing further heat loss.

One problem in both of the above examples is how to make the responsible persons aware of the potentially dangerous temperature conditions. One prior art method of monitoring orchard temperatures is for a workman to take temperature readings periodically at various locations in the orchard and to signal a helicopter whenever a dangerously low reading is found. The helicopter then hovers over the low temperature region so that the warmer air above the orchard is driven downwardly by the down draft from the helicopter rotor. This can provide, for example, a 3° temperature rise at the cold region in the orchard. The obvious problem with this method is that a workman must continuously monitor the thermometers. Another problem is that it is often difficult for the workman to signal the helicopter particularly at night or if the trees in the orchard are tall.

SUMMARY OF THE INVENTION

The present invention provides a temperature responsive signaling device which automatically informs the observer of a dangerous temperature condition. The signaling device of this invention can be used for many purposes including orchard or highway monitoring purposes.

With the present invention the signaling device includes a supporting structure, a light, and temperature responsive means responsive to the temperature of the air adjacent the signaling device being no greater than a preselected temperature for closing a circuit to the light and responsive to the temperature of the air being above the preselected temperature for opening the circuit to the light. Although other signaling means could be employed, one advantage of a light is that it provides a readily detectable signal at night when low temperature conditions are more likely to occur.

Because electrical power may not be available where the signaling device is to be used and in order to save the expense of wiring the signaling device, the light can advantageously be powered by a local power source such as a battery. To conserve battery energy, the present invention provides a flasher unit so that when the circuit to the light is closed, the light flashes periodically rather than burning continuously. To further conserve battery energy, the temperature responsive means draws no current. Thus, the temperature responsive means advantageously includes a sensor which is temperature responsive and a switch in the circuit to the light which is controlled by the sensor. The sensor draws no current and may take the form of, for example, a gas-filled tube. The gas within the tube expands and contracts with temperature variations to control the switch.

The sensor is preferably relatively sensitive and has no greater than a 2° differential, i.e., it closes the circuit at one temperature and opens the circuit at 2° above such temperature. A sensitive sensor prevents false warning signals. In addition, for orchard use, the temperature increase resulting from operation of the helicopter above the cold region is relatively small and the sensor must be capable of detecting this.

Another feature of this invention is that the temperature at which the signal is provided can be easily varied. This is important because it adapts the signaling device for multiple uses. For example, because the temperature at which the signaling device is actuated can be adjusted, it can be used for different crops each of which has a different danger temperature.

Different groves and different crops have different elevations at which the temperature must be sensed. For example, the critical location for tomatoes may be a relatively low elevation and the critical elevation for an orange grove may be relatively high. Similarly, for orchard applications, the light should be at an elevation above tree-top level so that it is readily visible from the air. To solve these problems the signaling device of this invention is of variable length and the elevation of the sensor can also be adjusted. This can be inexpensively and simply accomplished by providing a removable extension for elevating the sensing device and the light.

Another feature of the invention which if particularly applicable to agricultural usages is that the signaling device is lightweight and readily portable. One feature which contributes to its portability and the ease with which it can be set up is that a stake is employed at the lower end of the signaling device for embedding into the ground. This provides for quick and easy mounting of the signaling device and permits the signaling device to be removed when it is not being used to avoid any danger of vandalism. It also permits the signaling device to be used at multiple locations, if desired. The signaling device is also inexpensive which makes it feasible to use many of them in a single orchard.

To assure that the signaling device is fully operative prior to each usage, a test switch is provided which enables the light to be manually energized if the unit is fully operational. The test switch can advantageously be a manual switch placed in parallel with the switch controlled by the temperature responsive sensor.

The supporting structure of the signaling device can advantageously include a housing for containing the battery, the light, and a majority of the circuit. The housing protects these components against the weather and from damage. In order to give the sensor the maximum exposure to ambient air, it is preferably mounted on the outside of the housing and a guard is placed over the sensor to protect it. The light is preferably connected to the upper end of the housing, and the stake is preferably connected to the lower end of the housing. The extension for increasing the length of the signaling device can be advantageously threadedly attached to the stake and to the housing.

The invention can best be understood by reference to the following description taken in connection with the accompanying illustrative drawing.

BRIEF DESCRIPTION OF THE DRAWING

FIG. 4 is an enlarged, fragmentary sectional view taken generally along line 4—4 of FIG. 3.

FIG. 5 is a fragmentary, side elevational view illustrating how the length of the signaling device can be increased.

FIG. 6 is a schematic wiring diagram for the signaling device.

FIG. 7 is a somewhat schematic elevational view showing one use of the signaling device.

FIG. 8 is a somewhat schematic perspective view showing how the signaling device can be employed to provide a visible warning of an icy roadway.

DESCRIPTION OF THE PREFERRED EMBODIMENTS

Figure 1:
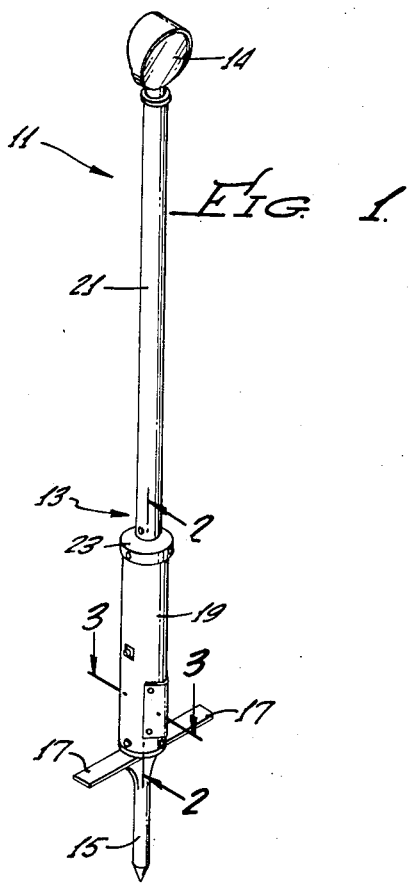
FIG. 1 is a perspective view of a temperature responsive signaling device constructed in accordance with the teachings of this invention.

FIG. 1 shows a signaling device 11 constructed in accordance with the teachings of this invention. The signaling device 11 includes a housing 13, a signal light 14, a stake 15 attached to the lower end of the housing, and arms 17 projecting radially outwardly of the stake. The stake 15 is adapted for insertion into the ground to thereby mount the signaling device 11 generally vertically. The arm 17 can be stepped on by the operator to facilitate insertion of the stake 15.

Figure 2:
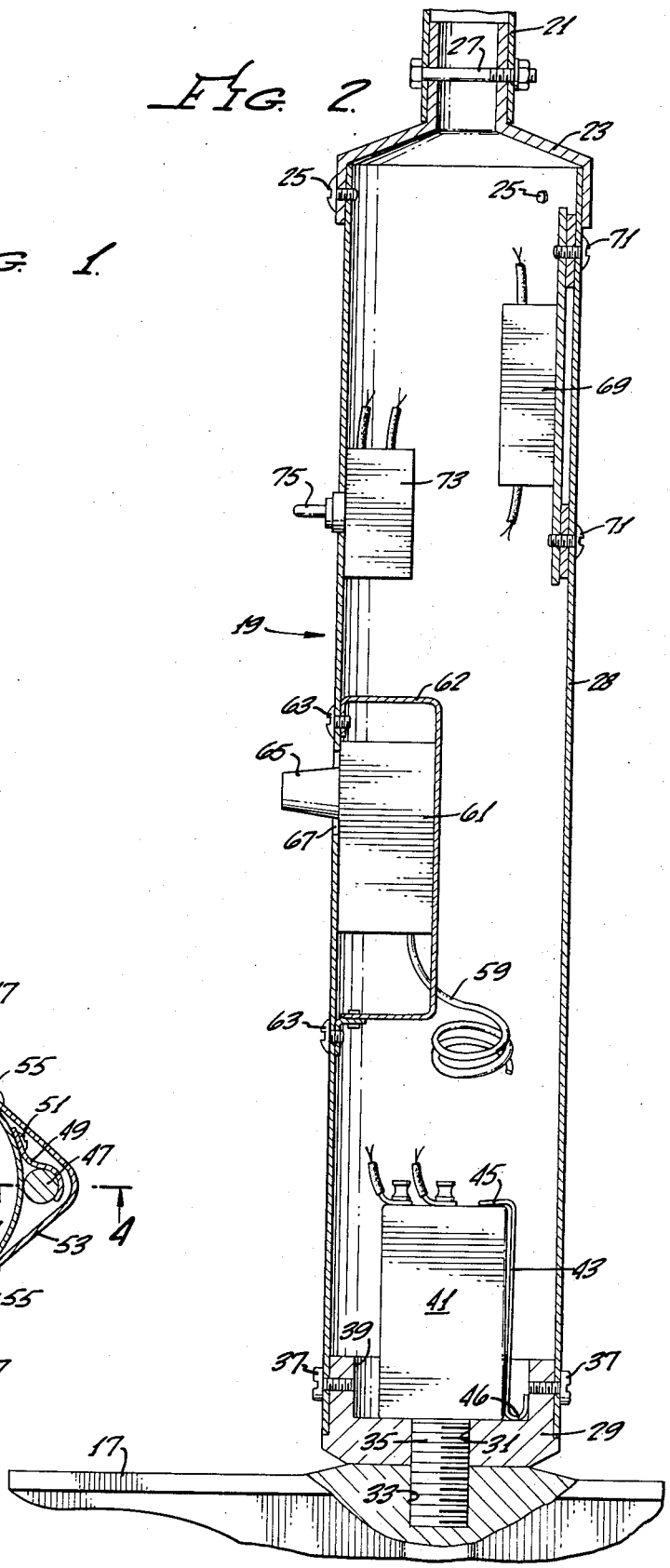
FIG. 2 is an enlarged, fragmentary, sectional view taken generally along line 2—2 of FIG. 1.

The housing 13 includes a lower housing section 19 (FIG. 2), an upper housing section 21, and a connector 23 for interconnecting the two housing sections. Although different configurations could be used, in the embodiment illustrated, both of the sections 19 and 21 are hollow cylinders with the latter being of larger diameter. The connector 23 receives the upper end of the lower section 19 and is suitably affixed thereto as by screws 25. The upper end of the connector 23 is received within the lower end of the upper section 21 and is suitably affixed thereto as by a threaded fastener 27 (FIG. 2). The housing sections 19 and 21 and the connector 23 are preferably constructed of a rigid material such as metal.

The lower housing section 19 includes a tube 28 and an end cap 29 having an internally threaded bore 31. The upper end of the stake 15 has an internally threaded bore 33. In the embodiment illustrated, the stake 15 is removably attached to the lower housing section 19 by an externally threaded nipple 35 which is received within the bores 31 and 33. The threaded connection between the stake 15 and the housing section 19 permits easy removal of the stake 15 to facilitate transportation and storage of the signaling device 11.

Figure 3:
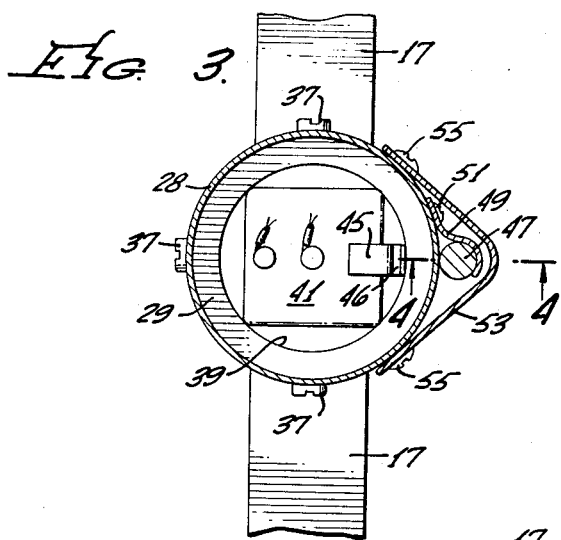
FIG. 3 is an enlarged, sectional view taken generally along line 3—3 of FIG. 1.

The end cap 29 is connected to the tube 28 in any suitable manner such as by screws 37. The upper face of the end cap 29 defines a recess 39 which is adapted to receive the lower end of a power supply which, in the embodiment illustrated, is in the form of a battery 41. The battery 41 is retained in the recess 39 by a spring clip 43 which has a retaining arm 45 overlying a portion of the upper end of the battery 41 and a U-shaped spring portion 46 which is resiliently and functionally retained between the battery 41 and the wall of the recess 39. The spring portion 46 resiliently urges the corners of the battery 41 (FIG. 3) into frictional engagement with the wall of the recess 39 to thereby retain the battery.

A sensor 47 (FIGS. 3 and 4) is mounted on the exterior of the lower housing section 19 in any suitable manner such as by a spring clip 49 which is affixed to the housing section 19 by a screw 51. The sensor 47 is preferably of the type which does not draw any current from the battery 41. The sensor 47 is relatively sensitive and may have a 2° F. differential. The sensor 47 must also provide a first signal when the air temperature at the sensor drops below a predetermined level and a second signal when the air temperature increases to a second predetermined level. The sensor 47 is of the type which contains a gas which thermally expands and contracts in accordance with its temperature. As such, the first and second signals referenced above are first and second pressure levels, respectively, of the gas in the sensor 47.

The sensor 47 is protected against damage by a guard which, in the embodiment illustrated, is in the form of a bent plate 53 which is attached by screws 55 to the lower housing section 19. The lower housing section 19 has an aperture 57 in the peripheral wall thereof. A capillary tube 59 extends from the sensor 47 through the aperture 57 to a pressure responsive switch 61 (FIG. 2) having a bracket 62 which is mounted on the housing section 19 by screws 63. The switch 61 opens when the pressure of the gas in the tube 59 increases to a predetermined level and closes when the pressure of the gas in the tube 59 drops to a lower level. The temperature level at which the switch 61 is operated can be manually controlled by a rotatable knob 65 which projects through an opening 67 in the peripheral wall of the lower housing section 19. Switches of this kind are available from Honeywell, Minneapolis, Minnesota.

A solid state flasher unit 69 (FIG. 2) is mounted within the lower housing section 19 by screws 71. A test switch 73 is also mounted within the lower housing section 19 with a manual switch button 75 for the test switch projecting through the peripheral wall of the lower housing section. The light 14 (FIG. 1) is suitably rigidly affixed to the upper end of the upper housing section 21. The necessary electrical leads between the battery 41, the switch 61, the flasher unit 69, the test switch 73, and the light 14, are all within the housing 13.

FIG. 6 shows a preferred wiring diagram for the signaling device 11. The battery 41, which may have a 6 volt rating, is coupled to the switch 61. The test switch 73 is connected in parallel with the switch 61 and both of these switches are in series with the flasher unit 69 and the light 14. The circuit to the light 14 can be closed manually by the test switch 73 to test the circuit. The circuit to the light 14 can also be closed by the switch 61 when the temperature at the sensor 47 drops below the value set by the control knob 65. In either event, the flasher unit 69 causes the light 14 to blink or flash at regular intervals until both of the switches 61 and 73 are opened.

FIG. 5 illustrates how the sensor 47 and the light 14 can be elevated. The sensor 47 should be at the elevation, the temperature of which it is desired to sense. The light 14 must be high enough so that it can be seen over any adjacent obstruction. This can be simply and inexpensively accomplished by replacing the nipple 35 (FIG. 2) with a longer nipple or a threaded extension 79, the opposite ends of which are received in the bores 31 and 33.

By way of example, the signaling device 11 can be positioned in a grove containing trees 81 (FIG. 7) by inserting the stake 15 into the ground using the arms 17. This firmly, but removably, mounts the signaling device 11. The length of the signaling device 11 should be selected by using extensions of 79 (if necessary) of appropriate lengths so that the light 14 is visible above the trees.

The temperature at which the light 14 is to be energized is then selected by turning of the control knob 65 with the temperature selected corresponding to the requirements of the particular trees 81. Prior to using the signaling device 11, the circuit of FIG. 6 is manually checked by closing the switch 73. When the ambient air temperature drops to the preset level, the gas within the sensor 47 and the tube 59 contract and the pressure thereof decreases. This pressure decrease is sensed by the switch 61 which automatically closes. As shown in FIG. 6, this completes a circuit to the light 14 through the flasher unit 69 and the light begins flashing. The flashing light 14 attracts the attention of the pilot of a helicopter 85 who hovers the craft above the signaling device 11. The down draft from the rotor blades of the helicopter 85 forces warmer air down onto the trees 81. Ultimately, the air temperature at the sensor 47 rises sufficiently, e.g., 2° F. so that the switch 61 opens whereupon the light 14 discontinues flashing. The signaling device 11 is readily portable and can be easily removed from the ground by simply pulling out the stake 15.

Another use of the signaling device 11 is illustrated in FIG. 8. In FIG. 8, the signaling device 11 has been placed by the side of a road 87 which is subject to becoming icy. In this instance, the knob 65 is turned to set the operating temperature at approximately 32° F. The sensor 47 should be located closely adjacent the surface of the road 87. A suitable warning sign 89 can be mounted on the housing 13, if desired. The signaling device 11 operates as described above to provide a warning of icy conditions along the road 87 when the air temperature closely adjacent the road is approximately 32° F.

Although exemplary embodiments of the invention have been shown and described, many changes, modifications and substitutions may be made by one having ordinary skill in the art without necessarily departing from the spirit and scope of this invention.

I claim:

1. A temperature responsive signaling device for use in warming plants comprising:

a supporting structure adapted to project above a supporting surface;
an electrical power source carried by the supporting structure;
a light mounted on said supporting structure above said supporting surface;
circuit means providing a circuit for coupling said power source to said light whereby said power source can energize said light;
temperature responsive means above the supporting surface responsive to the temperature of the air adjacent said device being no greater than a preselected temperature for closing said circuit and responsive to the temperature of the air being a predetermined amount above said preselected temperature for opening said circuit;
means for causing said light to flash when said circuit is closed;
manually operable means for adjusting said preselected temperature whereby the preselected temperature can be selected to suit the particular plant to be warmed; and
variable length means for changing the height of said temperature responsive means above the supporting surface whereby the temperature responsive means can be located at the desired elevation for the plant to be warmed.

2. A temperature responsive signaling device as defined in claim 1 wherein said supporting structure includes a housing, a stake adapted to be driven into the ground, and said variable length means includes an elongated extension threadedly connectible to said housing to elongate the signaling device and elevate said temperature responsive means.

3. A temperature responsive signaling device as defined in claim 1 wherein said temperature responsive means includes a switch and a temperature responsive gas operated sensor for controlling said switch.

4. A temperature responsive signaling device as defined in claim 1 wherein said supporting structure includes a housing and a stake adapted to be driven into the ground, said variable length means includes an elongated extension threadedly connectible to the housing and to the stake, said temperature responsive means draws no current and includes a switch and a temperature responsive gas operated sensor for controlling said switch, said sensor having a differential of no greater than about 2° F. and being mounted on the exterior of said housing, said signaling device also including a guard for protecting said sensor and a test switch in parallel with said first mentioned switch for testing said light, said power source includes a battery within said housing and at least a substantial portion of said circuit means is in said housing.

* * * * *